United States Patent [19]

Staub

[11] 3,780,794
[45] Dec. 25, 1973

[54] FOOD TABLE
[76] Inventor: Bernard Staub, 522 Thrush Dr., Dresher, Pa.
[22] Filed: Dec. 2, 1971
[21] Appl. No.: 203,960

[52] U.S. Cl............... 165/58, 126/21 A, 219/370, 219/400, 219/417, 219/430
[51] Int. Cl............................................. F25b 29/00
[58] Field of Search................... 219/370, 432, 400, 219/415, 214, 217, 218, 521, 370, 371, 530, 540, 417, 419, 430, 433, 435, 439, 441; 126/21 A; 312/236; 99/447; 165/58, 59; 62/58

[56] References Cited
UNITED STATES PATENTS

| 2,266,901 | 12/1941 | Parsons | 219/400 |
| 3,345,497 | 10/1967 | Porteous | 219/419 X |
| 2,187,196 | 1/1940 | Douglass | 219/415 X |
| 2,906,620 | 9/1959 | Jung | 219/400 X |
| 3,142,748 | 7/1964 | Warren | 219/392 |
| 3,167,639 | 1/1965 | Gaugler | 219/370 |
| 3,221,729 | 12/1965 | Beasley et al. | 126/21 A |
| 3,443,063 | 5/1969 | Berger et al. | 219/415 |
| 3,474,225 | 10/1969 | Leedy | 219/400 |
| 3,632,980 | 1/1972 | Hornaday, Jr. et al. | 219/370 |

FOREIGN PATENTS OR APPLICATIONS

| 550,920 | 2/1943 | Great Britain | 219/400 |
| 676,510 | 11/1929 | France | 219/400 |
| 341,788 | 1/1931 | Great Britain | 219/370 |
| 503,474 | 3/1920 | France | 219/400 |

Primary Examiner—Volodymyr Y. Mayewsky
Attorney—Caesar, Rivise et al.

[57] ABSTRACT

A food dispensing and storage device comprising a housing and a food dispensing pan positioned in the top of the housing. The housing includes a fan and a heat transfer means therein. The fan circulates air across the heat transfer means, under and around the food dispensing pan and back to the circulating fan. Thus, the air is completely circulated and recirculated around the pan. A temperature sensing element measures the temperature of the return air, which temperature also reflects the temperature of the pan, and therefore its contents.

15 Claims, 10 Drawing Figures

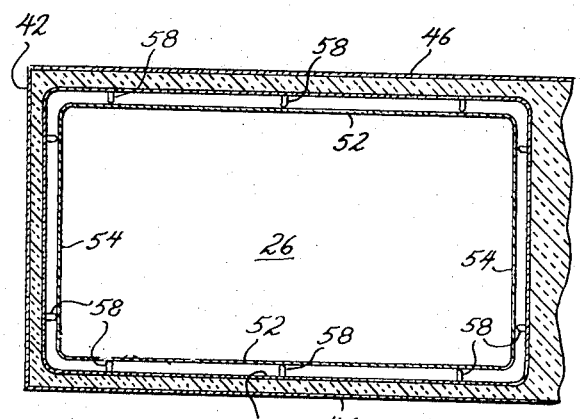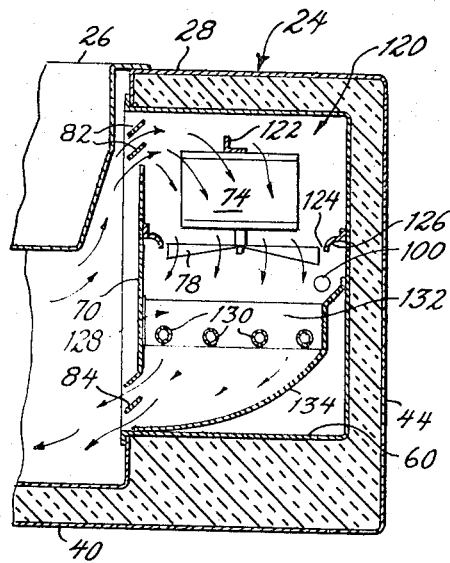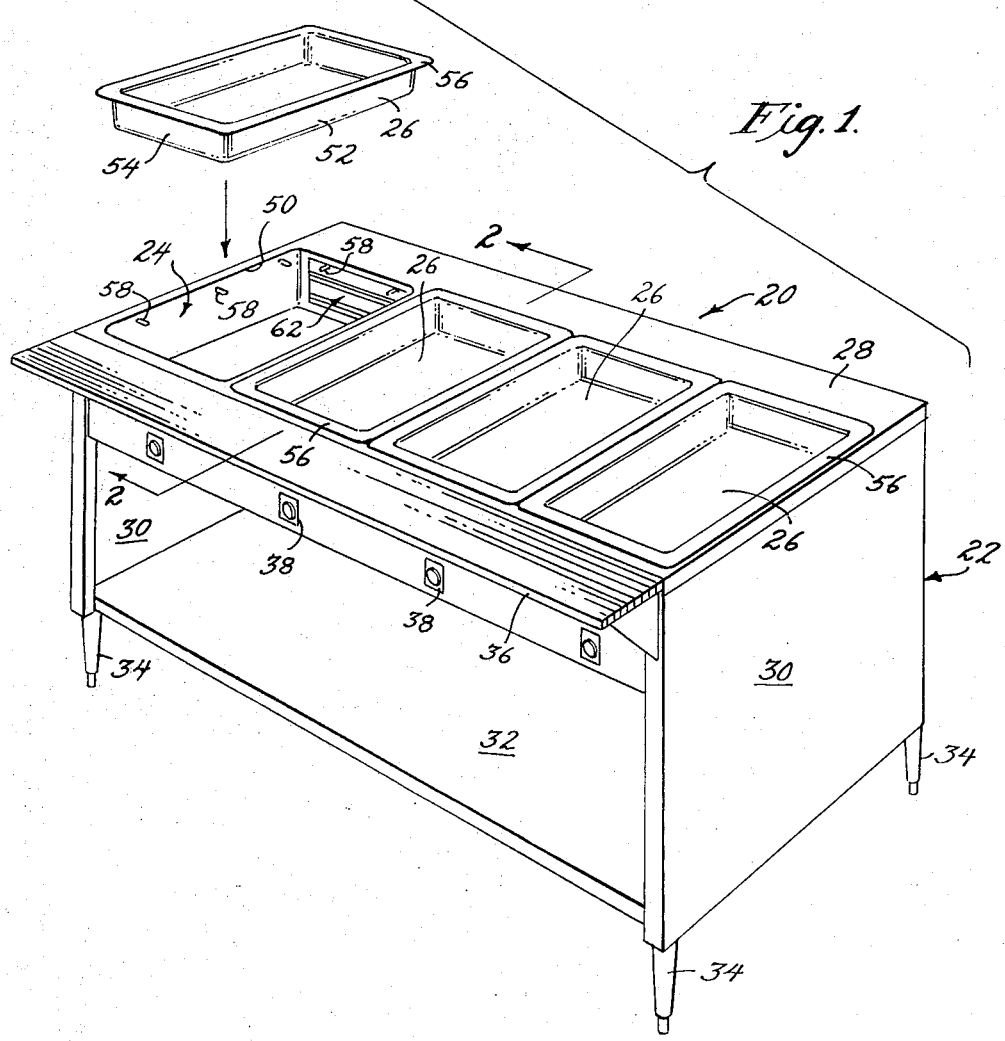

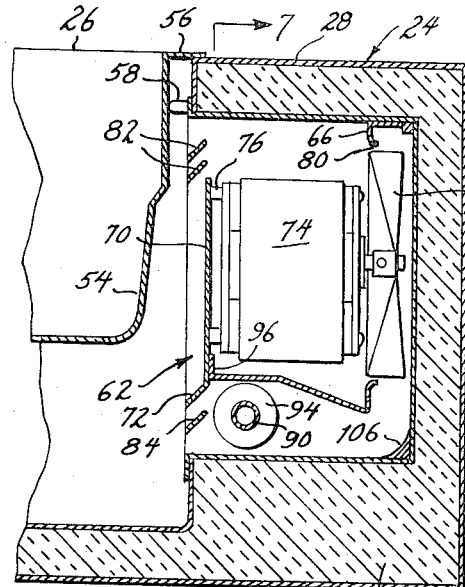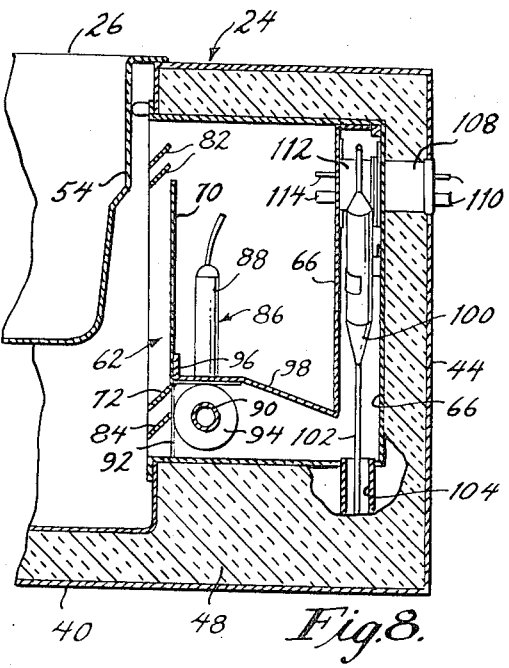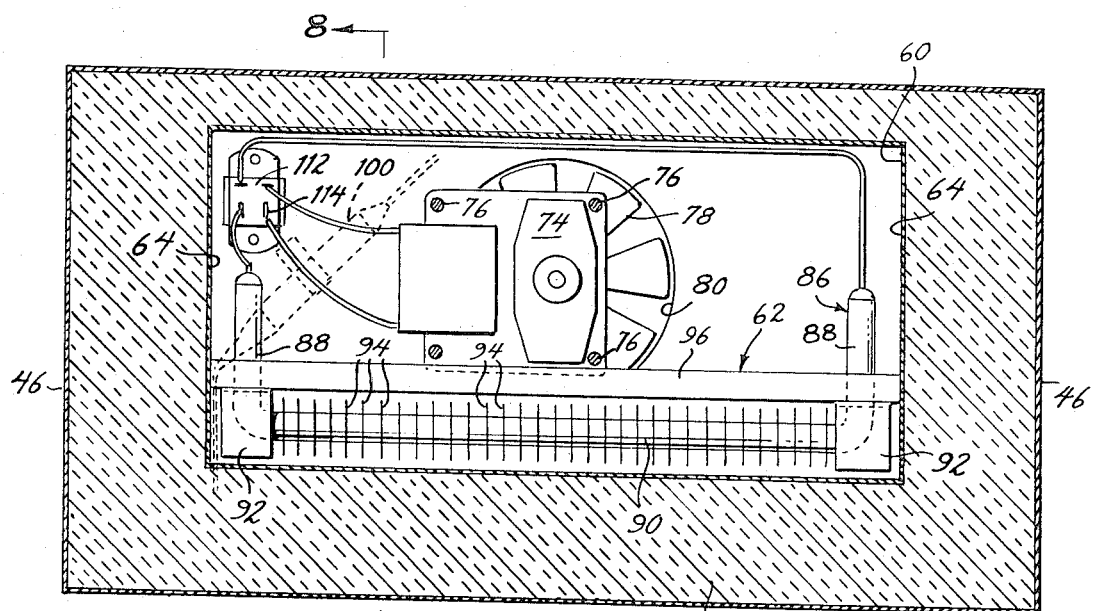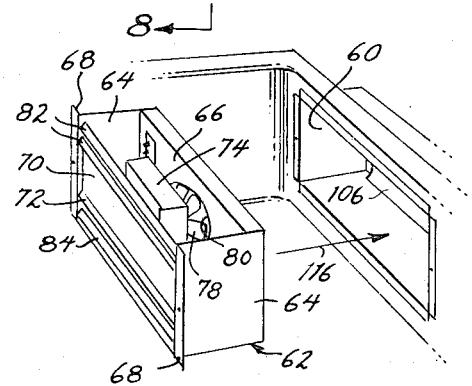

3,780,794

FOOD TABLE

This invention relates to a food table, and more particularly, to a food storage and dispensing device.

There are numerous devices now in use for the storage and dispensing of food. These devices are used in restaurants, cafeterias and sandwich shops. The devices are used for either keeping the food cold or hot.

One of the most prevalently used devices is the steam table. In the steam table, a quantity of water is placed in a trough, and food pans are positioned in the top of the table. The water in the trough is heated, and the hot water in turn keeps the food pans and their contents hot.

The use of the steam table has been found to be highly inefficient. Substantial quantities of energy are required for heating up the water, and this energy is entirely lost when the steam table is shut off at night. The cleaning of the steam table is also extremely time consuming and difficult. The people in the area of the steam table, such as food servers or consumers in line in a cafeteria, and adjoining equipment are constantly subjected to the vapors emanating from the steam table if the pans are not properly seated in the openings provided for them.

An intended improvement over the steam table was the dry heat table. In this device, the food pans are heated by a radiation plate. Heat for the radiation plate is in turn supplied by a gas burner which impinges on the bottom of the plate. Heat for the radiation plate has also been obtained utilizing a resistance heating element.

Although the dry heat table did furnish some improvements over the steam table, such as the obviating of the necessity of heating large masses of water prior to the attainment of operating temperatures and the subsequent dissipation and waste of this energy when the table was shut off, still the dry heat table generated many problems of its own. Food temperature control has proven to be extremely difficult. Additionally, the food in the food pan in contact with the walls or bottom of the food pan tended to become excessively dehydrated and/or burned after prolonged exposure to the radiating heat. Additionally, there was no way of varying the amount of heat dependent on the amount of food remaining in the pan, except by manual means. Thus, the temperature measured was solely the temperature of the compartment in which the food pan was set, and not the temperature of the food in the pan.

There are also presently in use numerous devices for dispensing foods which are served cold, such as cold cuts, fish and meat salads, lettuce, tomato, cheese, etc. These devices are generally used in sandwich preparation and cold platter preparation by a restaurant. In most of the devices presently in use, the cooling coil is located directly beneath the food pans. In order to prevent food from falling into the cooling coil, a plate must be placed over it. Accordingly, circulation of the air around the food pans is seldom direct, and not easily controlled. At best, it is hardly more than natural convection.

The device of this invention overcomes all of the problems of the existing and prior art food dispensing units. The device of this invention can be used for the dispensing of hot food or cold foods. Thermostatic control is provided, and the temperature measured is the temperature of the food pans. Thus, the temperature of the food can more accurately be controlled.

There is little loss of energy when the system is shut off at night, and no large amount of energy need be expended in order to bring the system up to its operating temperature. There is no direct radiant heating of the food pans, and the possibility of burning of the food is obviated by this omission, and the fact that the heat applied is substantially below baking temperatures.

It is accordingly an object of this invention to provide a novel food storage and dispensing device.

It is another object of this invention to provide a food storage and dispensing device in which the temperature of the food pan, and therefore its contents, is accurately controlled.

These and other objects of this invention are accomplished by providing a food storage and dispensing device comprising a housing, said housing having an opening at its top, a food dispensing pan positioned in said opening, air circulating means within said housing, and heat transfer means within said housing, said air circulating means being adapted to pass air over said heat transfer means in order to change the temperature of said air, circulate said air around said food pan, and back to said air circulating means whereby the air can be re-circulated.

Other objects and many of the attendant advantages of this invention will be readily appreciated as the same becomes better understood by reference to the following detailed description when considered in connection with the accompanying drawings wherein:

FIG. 1 is a perspective view of a food table embodying the present invention, with one food pan shown in exploded perspective;

FIG. 3 is a reduced sectional view taken along the line 3—3 of FIG. 2;

FIG. 6 is an enlarged sectional view taken along the line 6—6 of FIG. 5;

FIG. 7 is a sectional view taken along the line 7—7 of FIG. 6;

FIG. 8 is a sectional view taken along the line 8—8 of FIG. 7;

FIG. 9 is an exploded perspective view showing the heat transfer and circulation unit prior to its being inserted in the cavity of the housing of the device of this invention; and FIG. 10 is a sectional view similar to FIG. 7, and showing a modified form of the device of this invention.

Figure 4:
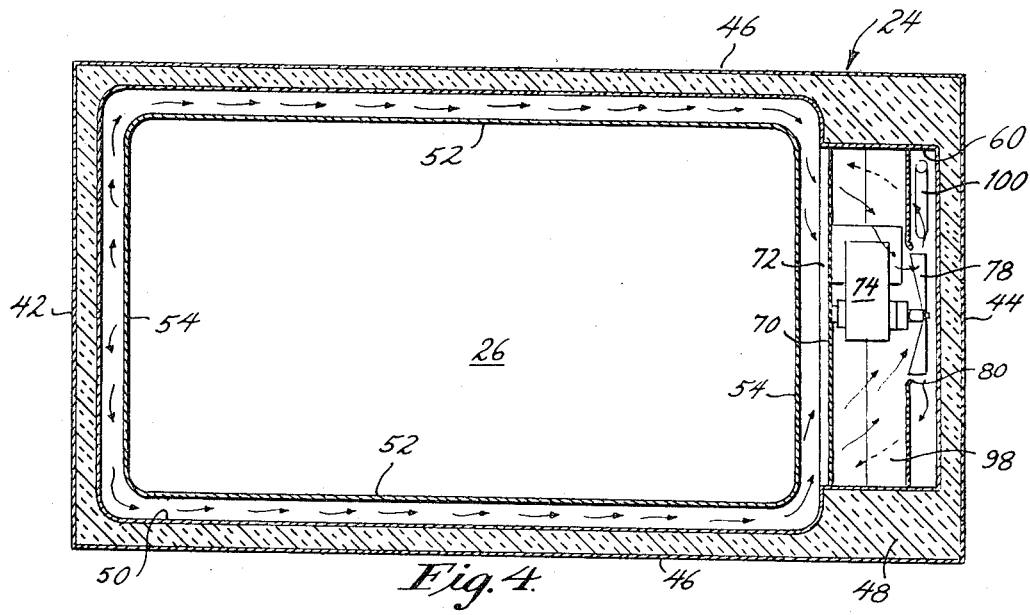
FIG. 4 is a sectional view taken along the line 4—4 of FIG. 2.

Referring now in greater detail to the various figures of the drawings wherein like reference characters refer to like parts, a food table embodying the present invention is generally shown at 20 in FIG. 1. Device 20 basically comprises a table 22 having a plurality of individual compartments 24 and a food pan 26 removably positioned in each compartment.

The outer structure of table 22 is similar to the food dispensing tables currently in use in that it includes an upper pan supporting surface 28, a pair of side walls 30, a shelf 32 and supporting legs 34. A cutting board 36 is mounted on the rear side of the table 22. An adjustable thermostat 38 is provided for each compartment 24 of the table. Since each compartment has its own thermostat, the temperature within each compartment can be controlled, irrespective of the temperature in the other compartments.

Figure 2:
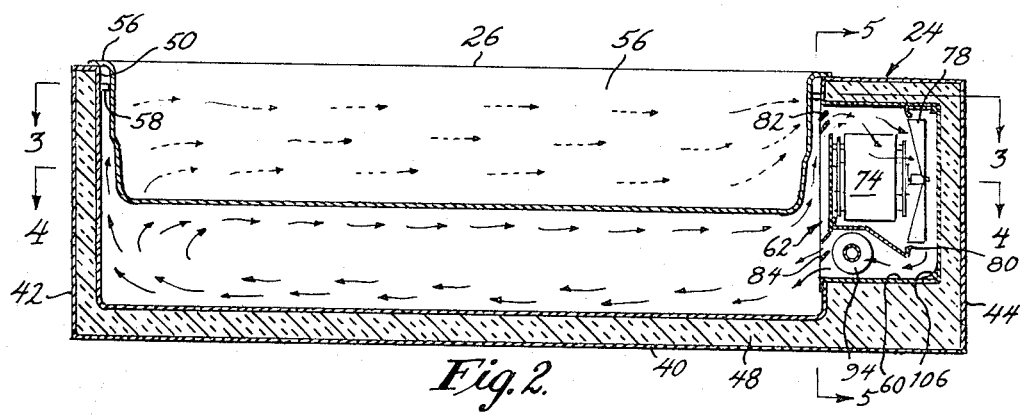
FIG. 2 is an enlarged sectional view taken along the line 2—2 of FIG. 1.
Figure 5:
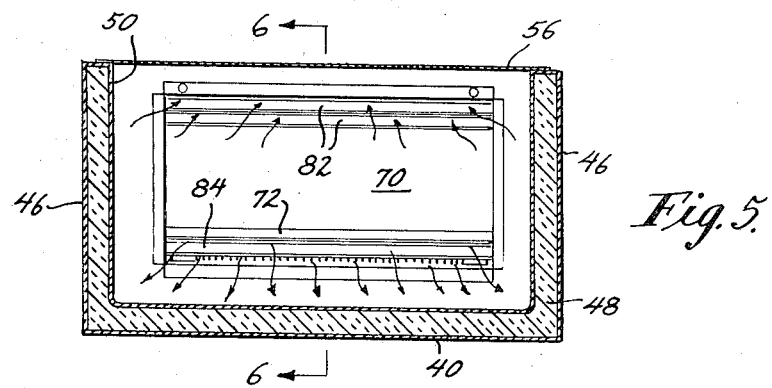
FIG. 5 is a sectional view taken along the line 5—5 of FIG. 2.

As seen in FIGS. 2 and 5, each compartment 24 comprises a bottom wall 40, end walls 42 and 44 and side walls 46. All of the walls are insulated, as shown at 48. Any type of insulation known to the art can be used, such as polyurethane foam, polystyrene foam or fiber glass.

Each compartment 24 includes a basically rectangular opening 50 at its top. Each pan 26 includes a bottom wall, side walls 52, end walls 54 and an outwardly extending lip 56 which extends around the entire perimeter of the pan. Nibs 58 are secured on the inner walls of compartment 24 adjacent opening 50. The nibs can be integrally molded in place or can be mechanically secured in place, as by rivets or screws. The nibs serve as spacers, and maintain the positioning of the food pan 26 within the compartment 24.

Referring to FIGS. 2 and 4, it is seen that the end of compartment 24 adjacent end wall 44 is provided with a fully insulated cavity 60. Cavity 60 is below opening 50 and positioned to one side of the opening, such that the cavity is not directly under the food pan 26. Mounted within cavity 60 is a heat transfer and air circulation unit 62.

Referring to FIG. 9, it is seen that the heat transfer and air circulation unit 62 is removable from cavity 60 as a complete unit. Unit 62 comprises side walls 64, a rear wall 66 and flanges 68 projecting from the ends of side walls 64. A plate 70 extends between side walls 64, and is secured thereto. As best seen in FIG. 6, plate 70 includes an outwardly flared flange 72 at the bottom thereof.

An electric motor 74 is mounted on plate 70 by any conventional means, such as bolts 76 (FIGS. 6 and 7). A fan 78 is mounted on the shaft of motor 74. As best seen in FIGS. 2 and 4, rear wall 66 includes a central opening 80 through which fan 78 projects. The perimeter of opening 80 is outwardly flared away from motor 74, as best seen in FIGS. 2, 4 and 6.

A pair of baffles 82 is mounted between side walls 64 and over rear plate 70. A baffle 84 is mounted between side walls 64 and below flange 72. A U-shaped resistance heater 86 (FIG. 7) having vertical legs 88 and bridging section 90 is mounted beneath motor 74. The heater is mounted in blocks 92 (FIG. 7) at the bends thereof. Spaced circular fins 94 are mounted on the elongated section 90 of resistance heater 86 (FIGS. 6 and 7).

A bar 96 (FIGS. 6 and 7) extends across the width of unit 62 and has its ends secured to end wall 64 of the unit. Bar 96 is also secured to the back side of plate 70. Unitary with bar 96 is a rearwardly extending partition 98. Partition 98 isolates the bridging section 90 of resistance heater 86 from the motor 74. The partition 98 extends across the entire width of unit 62. Partition 98 also supports blocks 92 of heater 86. AS is apparent from FIGS. 6 and 8, rear wall 66 of the unit is unitary with partition 98.

Mounted within cavity 60 and behind unit 62, is a temperature sensing element 100 (FIGS. 7 and 8). Element 100 includes a lead 102 that passes through a well 104 (FIG. 8) to thermostatic control 38 (FIG. 1). Cavity 60 further includes a rounded bottom edge 106 (FIGS. 6 and 9) which is used in aiding air flow through the cavity.

A female electrical plug 108 is mounted in end wall 44 of housing 24 (FIG. 8). Conventional electrical contacts 110 project from plug 108 outwardly of housing 24. As seen in FIG. 8, a male plug 112 is secured on back wall 66 of the air circulation and heat transfer unit 62. Plug 112 also includes conventional electrical contacts 114. As seen in FIG. 7, the motor 74 and the resistance heater 86 are electrically connected to plug 112 via conventional leads.

Referring to FIG. 9, it is seen that the unit 62 is insertable in cavity 60 by merely moving the unit in the direction of arrow 116. When the unit is inserted, the plugs 108 and 112 are automatically electrically connected, thereby electrically connecting the motor 74 and the resistance heater 86. The controls for these elements are all external, and are placed at any convenient location on the table 22. Because the air circulation and heat transfer unit are removable as a unit, they are readily serviced and easily replaced by the user of the food table should there ever be a malfunction in the unit associated with any of the compartments 24 in the food table.

In use, power is applied to the compartment 24 and the fan 74 is thereby turned on. The desired temperature for each compartment 24 is set on the thermostat 38 (FIG. 1) for the compartment. Since there is a separate thermostat for each compartment, and since each compartment is insulated and isolated from its adjacent compartment, the temperature can be varied for each compartment. Thus, it may be desired to have soup at a higher temperature than the other items being stored and dispensed from the food table. This is easily accomplished in view of the isolation of each compartment and the fact that there is a separate temperature control for each compartment.

After the unit has been started, the fan will blow the air in the direction of the arrows shown in FIGS. 2, 4 and 5. Thus, the air leaving fan 78 will initially contact the rear wall of cavity 60. It will then pass over the arcuate edge 106, under partition 98, and through the heat transfer means, which in the embodiment shown, is the resistance heater 86 having the fins 94. The air will then be heated and pass across the bottom of housing 24, thereby mixing with the air in the bottom of the compartment. When the air contacts the end wall 42 it will reverse direction and pass upwardly and around the bottom and sides of food pan 26, thereby heating the food pan and the contents thereof. The air will then return through baffles 82 to fan 78. At this point, the air will be re-circulated in the manner described above.

The direction of the air flow will always be that described above. Thus, opening 80 closely conforms to the outer diameter of the fan 78, as best seen in FIG. 7. The curvature of the lip surrounding the opening 80 is such as to create a Venturi effect, thereby drawing the air through the opening, and preventing the air from passing back through the opening after it hits the rear and side walls of the cavity 60. The baffle arrangement insures that the air will initially cover the bottom of the housing 24 and mix with the air therein before it is directed upwardly toward the pan 26. The spacers 58 insure that the pan 26 will always be concentrically placed within the opening 50. This insures complete air circulation around the sides of the pan, as seen in FIG. 4, while at the same time permitting easy insertion and removal of the pan. The plate 70 and the upper baffles 82 insure that the air will always return above the motor 74 to insure the circulation of the air in the proper directions and with the least turbulence.

One of the salient features of the device of this invention is the use of temperature sensing element 100 and its positioning. As is apparent from FIG. 4, the air passing across the element 100 is the return air being propelled by fan 78, as shown in FIG. 2. Once this system has been brought up to its pre-set temperature, the temperature of the return air will be equal to the mean temperature of the food pan 26 and its contents. Accordingly, the temperature in the food pans can be accurately controlled, regardless of the amount of food remaining in the pans. This in turn will allow for accurate control of the temperature of the food.

As pointed out above, temperature sensing element 100 is directly connected to the thermostat 38. The thermostat in turn will control the supply of electricity to resistance heater 86. Accordingly, when the temperature sensing element 100 senses a temperature equal to the pre-set temperature on the thermostat, the supply of electricity to resistance heater 86 will be terminated. However, the motor 74 will continue to operate, thereby continuing the circulation of air around food pans 26. When the temperature of the air falls to a pre-set temperature, electricity will again be furnished to the resistance heater 86, thereby again heating up the air. In this way, the temperature of the food pans can be kept relatively constant, within a small degree of variation.

It should be noted that the measuring of the temperature of the food pans provides a distinct advantage over the food tables of the prior art. When utilizing the radiant heaters of the prior art, it was extremely difficult, if not impossible, to accurately control pan temperatures, since there was no way of measuring the amount of radiation to the pan and contents. In the device of this invention, the amount of radiation to the pans and contents is infinitesimally small, and provides no serious impediment to the accurate control of pan temperature.

The water bath food tables require a great deal of energy to heat the water up to temperature, and the varying of the temperature is extremely difficult once the water has been heated. In the device of this invention, temperature control is extremely accurate and the operating temperature is easily changed. The placing of the temperature sensing element 100 upstream from the heating source permits the measurement of the temperature of the return air, and accordingly there is no interference caused by the heating of the air as it approaches the pans. Thus, the pans will remove heat from the air and the temperature measured by sensing element 100 is an accurate measurement of the pan temperature.

A modified embodiment of the heat transfer and air circulating unit is generally shown at 120 in FIG. 10. Unit 120 is positioned in cavity 60, in the same manner as unit 62. Additionally, unit 120 includes many of the same elements of the unit 62, such as plate 70, baffles 82 and 84, motor 74 and fan 78. However, in this embodiment, the shaft of the motor 74 points vertically downward, and the motor is supported by an angle bar 122. The fan 78 is positioned in an opening 124 of plate 126, which plate separates the motor 74 from the heat transfer unit. The perimeter of openings 124 is flared outwardly, away from the motor 74.

The heat transfer element 128 comprises four parallel connected tubes 130 which are mounted in a plurality of spaced rectangular fins 132 (one shown in FIG. 10). The tubes 130 contain any temperature varying medium, such as steam or a refrigerant, such as freon. Accordingly, the unit 120 is adapted for use in a food table that heats the food, or is adapted for use in a food table that chills the food.

When the housing 24 is used in a food table such as that shown in FIG. 1, there will be a single manifold for supplying steam or refrigerant to each set of tubes 130 in each compartment 24. The supply of steam or refrigerant to the individual compartment is controlled by a temperature-controlled solenoid valve or other type of valve. In this connection, it should be noted that the temperature sensing element 100 is positioned between the fan 78 and the heat exchange unit. Accordingly, as with the other embodiment of the invention, the temperature of the food pans will be sensed by the element 100, and the supply of steam or refrigerant to the tubes 130 will be controlled accordingly.

In the embodiment of the invention shown in FIG. 10, there is also an arcuate plate 134 that serves to direct the air passing through the heat transfer unit 128. The circulation of the air is identical to that shown in FIGS. 2, 4 and 5. Thus, the return air will pass through the fan 78 where its temperature is measured by the temperature sensing element 100. For the reasons set forth above, this temperature will be the temperature of the food pans 26. Where the temperature must be changed, the temperature sensing element will control the supply or lack of supply of steam or refrigerant to the tubes 130.

It is thus seen that the device of this invention is adapted for use with the heating of food or the chilling of food on a food dispensing table. Instead of using a complete table, such as that shown in FIG. 1, each cmpartment 24 can serve as a self-contained unit for the temperature control of individual food pans 26. Instead of using a single pan 26 to fill an opening 50, a group of pans can be used, so long as the entire opening 50 is covered, thereby preventing the escape of the circulated air into the atmosphere. The nibs 58 insure that the walls of the food pans 26 will always be some distance from walls 42, 44 and 46 when the pan is in opening 56, thereby insuring complete circulation around the pans, as seen in FIG. 4.

Various devices can be substituted for the nibs 58 in order to obtain the same results as those obtained by the use of the nibs. Thus, any spacer means that will space the pan 26 from the walls 42, 44 and 46 can be used. Other means that can be used are bars or wires on the walls 42, 44 and 46.

The device of this invention can be made from any of the materials known to the art, such as stainless steel or plastics. Stainless steel is preferred because of its durability and the fact that it can be easily cleaned.

The heat transfer and air circulation units can be plug-in assemblies, such as shown in FIG. 9, or can be permanently installed within cavity 60. In either event, they are remote from the food pans 26, and any food falling into the housing 24 will not contaminate or otherwise adversely affect the air circulation and heat transfer mechanism. The plug-in unit is preferred since the users of the food table can easily change a complete unit in the event that the unit becomes defective during use. Additionally, the unit can be removed for its daily cleaning, as well as the daily cleaning of cavity 60.

It will be noted by reference to FIGS. 2 and 10 that the bottom wall of cavity 60 does not extend to the bottom wall 40 of compartment 24. One advantage obtained by this construction is that there is no contamination of the cavity 60 by food debris, either liquid or solid, falling from the food pan through opening 50. A second advantage is that the air emanating from cavity 60 is directed downwardly by flange 72 and baffle 84, thereby permitting the air to mix with the air in the bottom of compartment 24 prior to contacting the food pan, as is apparent from the air flow arrows in FIG. 2.

The device is extremely efficient in operation, and no large amount of energy must be expended to bring the unit to its operating temperature. Likewise, there is no great loss of energy when the unit is shut down, as is the case when using the steam tables presently in use.

Without further elaboration, the foregoing will so fully illustrate my invention, that others may, by applying current or future knowledge, adopt the same for use under various conditions of service.

What is claimed as the invention is:

1. A food storage and dispensing device comprising a housing insulated walls, said housing having an opening at its top, a heat conductive food pan positioned in said opening and means supporting said food pan on said housing, said food pan projecting downwardly through the opening, a cavity formed in said housing, said cavity being positioned below said opening, said cavity being horizontally spaced from said opening, said cavity having insulated walls, air circulating means and heat transfer means within said cavity, said air circulating means being adapted to pass air over said heat transfer means in order to change the temperature of said air, circulate said air around said food pan and back to said air circulating means, whereby the air can be recirculated, and whereby debris falling into said housing from said food pans will not contact said air circulating means and said heat transfer means within said cavity.

2. The device of claim 1 and further including means formed on said housing at said opening for spacing said food pan from the walls of said housing in order to insure proper air circulation around said food pan.

3. The device of claim 2 wherein said spacing means comprises nibs on the walls of said housing.

4. The device of claim 1 and further including temperature sensing means within said housing, said temperature sensing means being positioned to sense the temperature of the air returning to said circulating means after contacting said food pan, whereby said temperature sensing means is adapted to sense the mean temperature of the food pan and its contents, and said temperature sensing means being adapted to control said heat transfer means.

5. The device of claim 1 wherein said heat transfer means comprises an electrical resistance heater.

6. The device of claim 1 wherein said heat transfer means comprises steam tubes.

7. The device of claim 1 wherein said heat transfer means comprises tubes carrying a refrigerant.

8. The device of claim 1 and further including first and second baffle means, said first baffle means being adapted to direct air which passes across said heat transfer means downwardly toward the bottom of said housing, and said second baffle means being adapted to direct the air which has contacted said food pan back to said air circulating means.

9. The device of claim 1 wherein said air circulating means comprises a fan, said fan being mounted on a motor shaft, said fan being positioned within an opening in a plate, said opening having an edge which is flared away from said motor, whereby said edge creates a Venturi effect to direct air in a direction away from said motor.

10. The device of claim 1 wherein said housing includes a bottom wall, said cavity having a bottom wall, with the bottom wall of said cavity being at a higher elevation than the bottom wall of said housing, whereby small amounts of liquid falling into said housing will not enter said cavity, and whereby air passing from said cavity will first be forced downwardly into said housing to mix with the air in said housing prior to contacting said food pans.

11. The device of claim 1 wherein said air circulating means and said heat transfer means are integrally connected as a unit, and said unit being removable from said cavity, whereby said cavity can easily be cleaned when said unit is removed, and whereby said device can be serviced by removing and replacing said unit when necessary.

12. The device of claim 11 wherein said unit has first electrical connection means thereon, said fan and said heat transfer means being connected to said first electrical connection means, said cavity having second electrical connection means secured on a wall thereof, said first electrical connection means being adapted to be electrically connected to said second electrical connection means when said unit is inserted in said cavity.

13. A food storage and dispensing device comprising a table, said table having a plurality of compartments mounted thereon, each compartment comprising a housing having insulated walls, said housing having an opening at its top, a heat conductive food pan positioned in said opening and means supporting said food pan on said housing, said food pan projecting downwardly through the opening, a cavity formed in said housing, said cavity being horizontally spaced from said opening, said cavity having insulated walls, air circulating means and heat transfer means within said cavity, said air circulating means being adapted to pass air over said heat transfer means in order to change the temperature of said air, circulate said air around said food pan and back to said air circulating means, whereby the air can be recirculated, and whereby debris falling into said housing from said food pans will not contact said air circulating means and said heat transfer means within said cavity.

14. The device of claim 13 wherein each compartment is insulated from the other compartments.

15. The device of claim 13 wherein the heat transfer means within each compartment is thermostatically controlled, whereby the temperature of each compartment can be maintained at a different level from the levels in the other compartments.

* * * * *